United States Patent
Rusterholz

(10) Patent No.: US 9,617,086 B2
(45) Date of Patent: Apr. 11, 2017

(54) PROCESS AND TUBULAR DEVICE FOR THE CONTROLLED FEEDING OF INCOHERENT SOLID MATERIALS IN DIFFERENTIATED PRESSURE SYSTEMS

(71) Applicant: Armin Rusterholz, Arni (CH)

(72) Inventor: Otto Rusterholz, Milan (IT)

(73) Assignee: Armin Rusterholz, Arni (CH)

( * ) Notice: Subject to any disclaimer, the term of this patent is extended or adjusted under 35 U.S.C. 154(b) by 236 days.

(21) Appl. No.: 14/361,100

(22) PCT Filed: Nov. 16, 2012

(86) PCT No.: PCT/EP2012/072847
§ 371 (c)(1),
(2) Date: May 28, 2014

(87) PCT Pub. No.: WO2013/079338
PCT Pub. Date: Jun. 6, 2013

(65) Prior Publication Data
US 2014/0356079 A1    Dec. 4, 2014

(30) Foreign Application Priority Data
Nov. 28, 2011 (IT) .............................. MI11A002166

(51) Int. Cl.
*B65G 53/16* (2006.01)
*B65G 51/02* (2006.01)
*B65G 53/52* (2006.01)

(52) U.S. Cl.
CPC ........... *B65G 51/02* (2013.01); *B65G 53/525* (2013.01)

(58) Field of Classification Search
CPC .............................. B65G 53/16; B65G 53/524
(Continued)

(56) References Cited

U.S. PATENT DOCUMENTS 3,295,896 A    1/1967    Hurtig et al.
3,871,711 A    3/1975    Rusterholz
(Continued)

FOREIGN PATENT DOCUMENTS

DE    2621270 A1    11/1976
EP    1566353 A2    8/2005
(Continued)

OTHER PUBLICATIONS

International Preliminary Report dated Jun. 3, 2014 for International Application PCT/EP2012/072847.
(Continued)

*Primary Examiner* — Joseph Dillion, Jr.
(74) *Attorney, Agent, or Firm* — Paul D. Bianco; Gary S. Winer; Fleit Gibbons Gutman Bongini & Bianco PL

(57) ABSTRACT

A process and device for controlled feeding of incoherent solid materials for differentiated pressure systems along a pipeline through the pressure of a fluid in the gaseous state. The pipeline is obtained by combining a plurality of consecutive trunk sections. The device includes a mechanism for intermittent feeding of the incoherent solid material in the pipeline, a mechanism for feeding the gaseous fluid under pressure in a plurality of predefined feeding points of the pipeline, a first series of valve members applied to each trunk section for intercepting the pipeline under control, a second series of valve members applied to each trunk section for allowing the escape of the expanded gaseous fluid from the pipeline and centralized control for closing the first series of valve members and for the concurrent opening of the second series of valve members. The feeding mechanism for the gaseous fluid under pressure can introduce the gaseous fluid under pressure in each feeding point of the pipeline when the first valve members located upstream of the feeding point are closed and the first valve members
(Continued)

located downstream are open, and when the second valve members located upstream of the feeding point are open and the second valve members located downstream are closed.

9 Claims, 2 Drawing Sheets

(58) Field of Classification Search
USPC .............................. 406/50, 85, 127, 144, 192
See application file for complete search history.

(56) References Cited

U.S. PATENT DOCUMENTS

| | | | |
|---|---|---|---|
| 4,036,531 A | 7/1977 | Rusterholz | |
| 4,699,548 A | 10/1987 | Bergstrom | |
| 4,893,966 A * | 1/1990 | Roehl | B65G 53/32 |
| | | | 137/624.14 |
| 5,370,148 A | 12/1994 | Shafer | |
| 5,490,745 A * | 2/1996 | Thiele | B65G 53/46 |
| | | | 251/147 |
| 6,283,680 B1 * | 9/2001 | Vidal | B65G 53/32 |
| | | | 222/207 |
| 6,287,056 B1 | 9/2001 | Szikszay | |
| 7,241,080 B2 * | 7/2007 | Klobucar | B05B 7/1459 |
| | | | 406/106 |
| 2005/0095071 A1 | 5/2005 | Kleineidam | |

FOREIGN PATENT DOCUMENTS

| | | |
|---|---|---|
| FR | 2204559 A1 | 5/1974 |
| IT | 974658 B | 7/1974 |
| IT | 1038174 B | 11/1979 |
| IT | 1046151 | 6/1980 |
| IT | 1046151 B | 6/1980 |
| IT | 1051743 B | 5/1981 |
| JP | 61018635 A | 1/1986 |

OTHER PUBLICATIONS

International Search Report dated Jan. 14, 2013 for International Application PCT/EP2012/072847.
Written Opinion dated Jan. 14, 2013 for International Application PCT/EP2012/072847.

* cited by examiner

PROCESS AND TUBULAR DEVICE FOR THE CONTROLLED FEEDING OF INCOHERENT SOLID MATERIALS IN DIFFERENTIATED PRESSURE SYSTEMS

The present invention relates to a tubular device for the controlled feeding of incoherent solid materials for differentiated pressure systems, in particular for pneumatic transport systems and a process for the controlled feeding of incoherent solid materials for differentiated pressure systems.

Several versions of pneumatic transport systems for incoherent solid materials are known from the prior art, and typical but non-exclusive examples are transport systems for corn, fertilizers, plastic materials in the form of chips and powders and others.

An almost universal feature of all these systems and devices of the prior art is that a compressed fluid current, generally air, is used in a continuous flow for conveying the above incoherent solid materials. In the practise, a sort of mixture is formed between the transporting fluid and the material to be transported, which is pushed within pipelines that start from hoppers, vessels or storage silos and are terminated by receiving hoppers or bins.

Other systems and processes for the pneumatic transport of incoherent solid materials within pipelines by pulse waves of compressed air are described and claimed, by the same applicant, in Italian patents IT 974658, IT 1038174, IT 1046151 and IT 1051743, as well as in several patents filed and issued abroad claiming the priority of said Italian patents.

However, also the systems described in said Italian patents exhibit the drawback of having to provide for a feeding silo or vessel upstream of the transport line. The vessel is pressurized and the material to be transported is fed by gravity into the same vessel by a hopper or through a dedicated container. In the systems intended to transport a large amount of material, the feeding silo or vessel must consequently have very large dimensions, considerably increasing the overall dimensions and the overall costs of the entire system.

The general object of the present invention therefore is to provide a tubular device for the controlled feeding of incoherent solid materials in differentiated pressure systems, in particular for pneumatic transport systems and a process for the controlled feeding of incoherent solid materials for differentiated pressure systems.

In detail, an object of the present invention is to provide a process and a tubular device for the controlled feeding of incoherent solid materials in differentiated pressure systems which, in addition to allow the transport of such material to a virtually unlimited distance, simplifies the feeding step of the same material in the transport line, without requiring any pressurized feeder vessel. For systems having already material transport capacity up to 300 tons/hour, in fact, the overall dimensions are particularly critical due to the presence of the feeder vessel. The elimination thereof allows not only the whole system to be simplified but also the related manufacturing costs to be reduced. In this connection, this capacity of feeding bulk material directly from any storage source with the tubular feeder into the conveying line, includes among many other the efficient discharge of standard ISO containers or mobile pressure vessel used on railway and truck transport.

Another object of the present invention is to provide a process and a tubular device for the controlled feeding of incoherent solid materials in differentiated pressure systems which retains the possibility of being divided into a plurality of modular elements, so as to allow an extension of existing systems simply by the addition of standard modular elements.

These and other objects according to the present invention are achieved by providing a tubular device for the controlled feeding of incoherent solid materials for differentiated pressure systems as described in the independent claim 1 and a process for the controlled feeding of incoherent solid materials for differentiated pressure systems as described in the independent claim 4.

Further features of the invention are described in the dependent claims, which are an integral part of the present description.

In general, the present invention relates to a tubular device for the direct feeding of the transport line without the need for a pressurized loading vessel, as conversely it happens with the pulse wave devices and methods object of the above patents, but capable of ensuring the utmost efficiency and several operating modes, as shall be better explained in the following detailed description. Such tubular device may be advantageously used:

- for feeding traditional transport systems at dense or diluted phase, also existing ones, using the onsite equipment;
- for the pneumatic feeding and transport of materials of various types directly into the production processes, and for weight control with "on-line" weighing;
- for the extraction of raw materials from silos and the subsequent pneumatic conveyance to the process, with possible intermediate operations such as weighing, mixing, cooling of components and so on;
- capable of carrying out the pickup of the incoherent solid material from any workstation or group of workstations and to feed said material to any destination or group of destinations.

The system according to the present invention does not require any pressure vessel; it operates both with positive and negative pressure at the same time and is able to pick up material from multiple points and delivering to multiple destinations as such as we would want on an ideal system.

The new system always operates according to the "pulse-wave" method, whether it is positive or negative range.

All previous comparable systems operate either only with positive or negative pressure. Working only with positive pressure has two great disadvantages regarding the weight and required spaces of the device.

On the other hand working only with negative pressure has the major disadvantage that such a system is unable to supply multiple destinations.

The fact that the system uses both $\Delta(+)$ and $\Delta(-)$ pressure method, a further reduction of the energy required is feasible due to the fact that suction is applied on short distances (dense phase) for easy and ecological pick-up, making this system apt for any configuration and for all purpose uses. These are important economic factors.

The importance of this unique innovation depends greatly on the combination and the result of the individual synchronism of the specific steps and interplay within the entire system.

The great value of this new system arises from the fact that this procedure and this method can be used independently and virtually in all fields of industrial operation, for any material and in all pressure ranges and other parameters.

Another advantage of this system is the fact that material is moved only in pipes. Hence manufacturing in strict compliance regarding contamination or hygiene and health regulations are observed.

A further broad field of employment of this modern technology is underwater, e.g. extraction of manganese nodule and other specific materials from sea ground.

Not requiring a pressure vessel (or other mechanical-feeders, e.g. rotary valves, screw pumps), this new method can obviously be used for the transport of any liquid materials as well.

The best combination of all these advantages mentioned equates to the invention and meets the demand of a modern transport system.

The features and the advantages of a process and a tubular device for the controlled feeding of incoherent solid materials in differentiated pressure systems according to the present invention will appear more clearly from the following description, made by way of an indicative non-limiting example with reference to the annexed schematic drawings, wherein.

Figure 1:
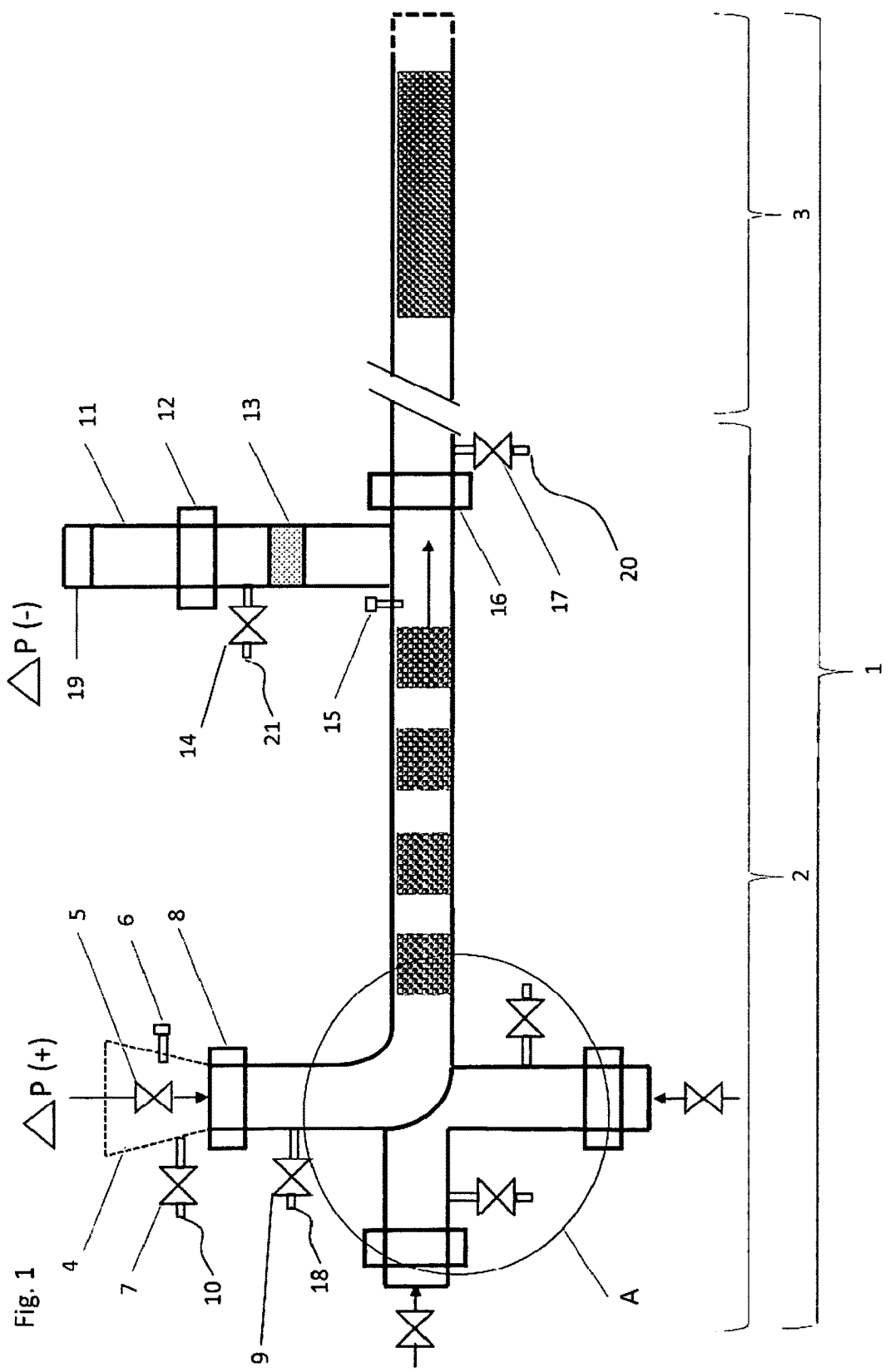
FIG. 1 shows a schematic view of the essential components of the device according to the invention.
Figure 2A:
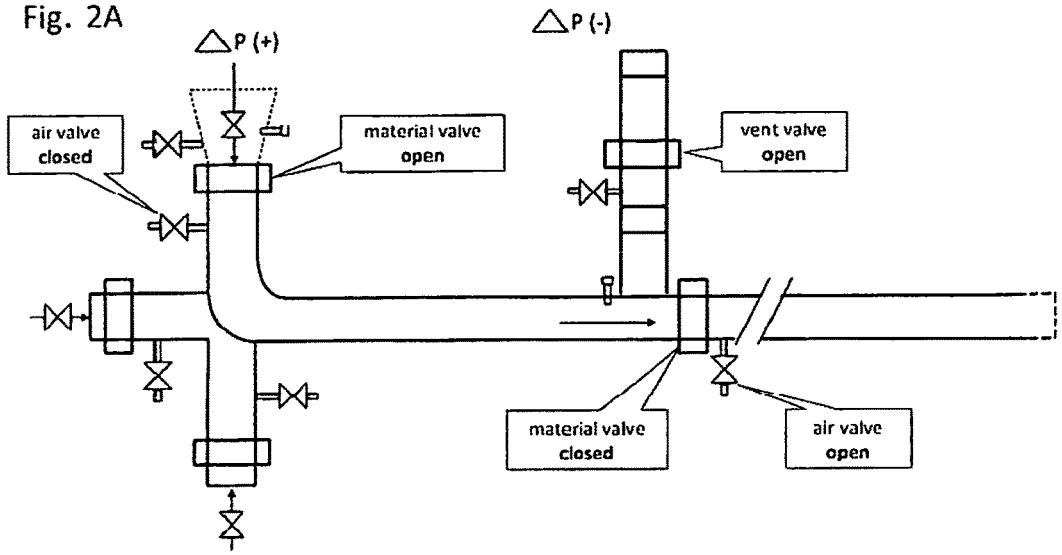
FIG. 2 shows the operation of the device and the pressure diagram according to the invention by status "loading (A), status "unloading" (B) and pressure diagram (C), indicating pressure assistance (a), vacuum assistance (b) and push-pull assistance (c).
Figure 2B:
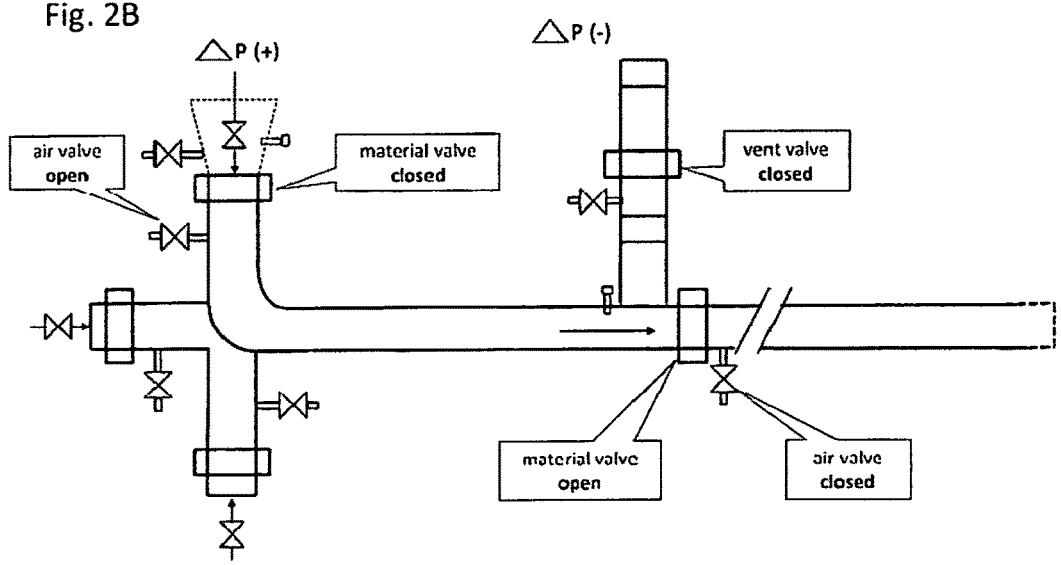
Figure 2C:
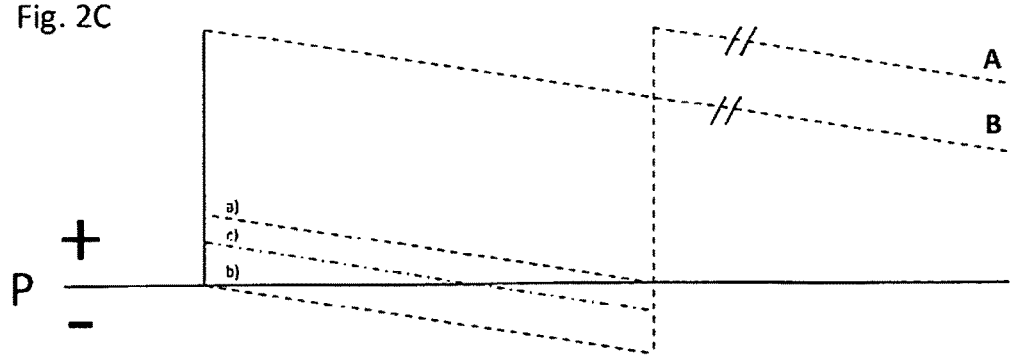

With reference to the figures, a device or transport line according to the invention is shown, globally indicated with reference numeral 1. The transport device 1 comprises a tubular feeder 2 and a pipeline 3 with open discharge end with the option to add modular elements.

The transport device 1 further comprises, preferably upstream of the pipeline, a pressurized tubular feeder 2 capable of carrying out the pick-up of the incoherent solid material from any workstation or group of workstations and to feed said material to any destination or group of destinations for the transport in ideal dense phase, both on the inlet side (of minimum length), and on the outlet side of the feeder, following the method "Pulse Wave" described in the above patents. The pressurized tubular feeder 2 may in any case be arranged in any point of the pipeline without departing from the protection scope of the present invention.

The tubular feeder 2 is provided with a vent duct 11 with relative vent valve 12 and filter 13 of a first inlet duct 18 for compressed air, equipped with a first air interception valve 9 and a second inlet duct 20 for compressed air, equipped with a second air interception valve 17 and located downstream of said first compressed air inlet duct 9. The pressurized tubular feeder 2 is further provided with a first valve 8 for intercepting or transporting the incoherent solid material, arranged upstream of the first inlet duct 9 for compressed air, and with a second valve 16 for intercepting or transporting the incoherent solid material, arranged upstream of the second inlet duct 20 for compressed air.

The sizing of the tubular feeder 2, which works as a material lock device, is regulated on the basis of the useful volume comprised between the first valve 8 for intercepting the incoherent solid material, interposed between the loading hopper 4 and the first inlet duct 18 for compressed air, and the second valve 16 for intercepting the incoherent solid material. The number of hourly cycles, the performance coefficients and parameters may freely vary with compact versions of the tubular feeder 2. Two or more units of the tubular feeder 2 in parallel mode may be provided for very high flow rates and/or to obviate any malfunction of any system valve or for allowing the maintenance thereof. In other words, the design and construction of the transport line 1, in this context of very variable factors and conditions, are based on the "do-it-yourself" concept.

The modular elements consist of a limited number of highly standardized components, of convenient and facilitated use and with operating guarantees related to the use conditions of the "ECONORMVEYOR®" brand. It is possible to use software for replicated systems. An electronic panel (not shown) may be used, with relative instrumentation, for controlling the operating parameters of the transport line 1. Thanks to the use of the modular elements it is possible to convert existing transport systems into modern high efficiency systems.

The material interception valves 8 and 16 are configured for the free 360° positioning and have a diameter equal to the nominal diameter of the tubular feeder 2. Therefore, no actuators reinforced with loading valve mounted in vertical and gate also forced to the cut of the static product column are required. Inlet and outlet ducts may be provided in the tubular feeder 2 for the utmost cleaning of the material residues, so as to carry out a cyclic cleaning with the immediate forming of a clean air shield that with an infinitesimal advance carries out the cleaning of the ring zone of the elastic seal of the material interception valves 8 and 16, while carrying out the ejection of large particles from the "moon" zone of the sphere/dome in the closing (not shown). By "moon" zone it is meant the decreasing opening that results during the closing step of a spherical valve.

A necessary condition for the operation of the transport line 1 is that of providing a device adapted to fluidize the incoherent solid material passing into hopper 4, as shown in FIG. 1. Such fluidization, carried out inside hopper 4, must be suitably proportioned and such as to facilitate and allow only the outflow of the material towards the tubular feeder 2. In FIG. 1, the valve that carries out the fluidization of the material is indicated with reference numeral 7, whereas the compressed air valve 5 with its nozzle correctly inserted, positioned within hopper 4, aids the material fluidization valve 7 with one or more pulses, if required, in case of insufficient pressure differential $\Delta P(+)$.

The feeding of the transport line 1 is therefore direct, that is, without the need for a pressurized storage vessel, of predetermined volume, as it happens in systems according to the prior art. The material feeding function is carried out by the same transport pipeline, that is, by the modular tubular feeder having free capacity, measurable from the tubular volume created by the distance between the two material interception valves 8 and 16, as per general diagram of FIG. 1. For example, should it be necessary to double the load volume, it would simply be necessary to double the distance between the two material interception valves 8 and 16.

It is noted that the pipeline trunk section comprised between said two material interception valves 8 and 16 may be arranged in the space either in vertical direction or in horizontal direction, or slanted, and also making it take up elliptical, helical or even circular shapes according to the needs.

In some cases there is an operating variant of the tubular feeder 2. In these cases, the first material interception valve 8 is closed and at the same time, compressed air is introduced through one or more pulses for positioning the load of material already introduced more forward.

The material feeding is controlled and assisted by a pressure differential $\Delta P$ available or suitably created. Transport therefore is of the high performance-sucking/pressing type applicable to a large number of practical configurations.

As regards the initial loading step of the material, the condition of "vacuum" inside the tubular feeder 2, indicated in all the diagrams with the abbreviation ΔP(−) is particularly important and such as to allow the elastic and forced attraction of the material towards the outlet of such feeder as soon as the material interception valve 8 located upstream of the tubular feeder is opened. This attraction/action, originated by a forced and adequately proportioned vacuum, is such as to make the material cross the predetermined path by a suitably controlled suction device.

In order to ensure the material discharge along the entire transport line 1, it will be necessary to install an electronic control panel and relative adequately positioned and calibrated sensors. The same concept may be applied at the terminal of the transport line 1, for example for feeding and injecting the material directly into process equipment with high pressure and temperature conditions, such as furnaces, iron and steel works, concrete plants, etc.

The possibility of using the vectorial sum of two active forces, of which one is the force resulting from the introduction of compressed air exerted upstream of the tubular feeder 2, and the other is that concurrently resulting from the suction applied downstream of such tubular feeder 2, more precisely at the output of the vent valve 12, has special importance.

The possibility of using the tubular feeders 2 in various processing industries, combining with simplicity the in line weighing function of the same materials during transport is particularly interesting, also considering the fact that the current technologies available would allow it. The confirmation of the system modularity is automatically claimed by the possibility of using standardized modular elements in the systems.

The transport line 1 thus structured retains the capacity of being extended into a plurality of modular elements, so as to allow an extension of existing systems by simply adding standardized modular elements. As described above, each standardized modular element comprises three valves, that is, a vent valve, a valve for intercepting or transporting the material and a valve for intercepting (introduction/exclusion) the air. All the valves, according to the situation or step of the transport cycle, may change their opening or closing function.

Let us consider for example two consecutive standardized modular elements of the transport line 1. The latter two modules, taken as a whole, constitute a so-called "modular group". Any group of this type, used in the transport line 1, represents the renewal and/or the extension of the same transport line 1. Each group thus formed in fact allows the system to be extended by about 500 meters (approximate values). Accordingly, it is inferred possible that for example two or three groups allow the system to be extended by about 1000 or 1500 meters (approximate values). Accordingly, a further advantage of the device according to the invention is to be able to widen and extend also a conventional or old design system by hundreds or thousands meters and thus transform it into a modern high efficiency system.

Another substantial difference between current systems and those according to the invention consists in the fact that in current systems, the closing sphere/semi-sphere inside the material transport valve is used for cutting the column of material, creating considerable operating and wear problems and thereby decreasing the number of life cycles of such material transport valve. Conversely, in device 1 according to the invention this intensive and useless stress of the portion of the sphere/semi-sphere in contact with the material during the closing step is prevented respectively thanks to the already mentioned cleaning device of the first valve 8 for intercepting the material and by a similar cleaning device of the second valve 16 for intercepting the material, respectively. For such reason it is theoretically possible to position valves 8 and 16 for intercepting the material up to 360°. It is noted that said cleaning technique may be applied according to convenience also to other types of system valves, such as for example vent valves.

The difference between a modular group as the one just described and the particular tubular feeder 2 is clear. In fact, the exception is the initial material transport step, or product feeding step, which starts thanks to the pressure differential ΔP measurable between the inlet and the outlet of the tubular feeder 2. Such pressure differential ΔP is consequent to the application of an air jet at the inlet of the first transport valve 8 if a material head sensor 6 for measuring the amount of material measures a suitable amount of material inside hopper 4.

Of course, since the application of the above air jet under pressure is not always required or possible, it is envisioned to load the material by means of the vacuum created downstream of the vent valve 12 and of the filtering unit 13. The vacuum may be brought in contact with the material awaiting the load through a cyclical release and the relative opening/closing of the interception valve 8. This cyclical release of the vacuum may also accompany and serve the controlled transfer of the column of material, all according to the possible feeding variants of the material.

In brief, a measured amount of material to be transported receives an air pulse, for example lasting a few seconds, as soon as it is introduced into the tubular feeder 2 and is pushed at intervals along the pipeline. Then, as soon as the filling control sensors of the tubular feeder 2 signal the maximum capacity reached, in the closing step of the first valve 8 for intercepting or transporting the material, a step of cyclical cleaning is carried out at the same time on the "moon" closing zone of such valve 8 by the cleaning valve 9. In an infinitesimal instant subsequent to such cleaning step, the sealing closing valve activates and closes the first valve 8 for intercepting the material.

When the tubular feeder 2 contains a certain amount of material and the first valve 8 for intercepting the material is fully closed, and of course also the cleaning step of the "moon" zone of such valve 8 has ended, the vent valve 12 downstream of the tubular feeder 2 is closed and compressed air is introduced, through the first air interception valve 9, which in addition in the final closure movement of the material valve provides the cleaning of its intercept, for pushing the material downstream of feeder 2. At this point, the material is unloaded from feeder 2 in the actual transport line, opening the second valve 16 for intercepting the material. The material that has come out of feeder 2 is then ready to be picked up again and further pushed forward in the transport line, closing the second valve 16 for intercepting the material and injecting compressed air through the second air interception valve 17.

In this step, the material may have reached the destination for the final unloading or as an alternative, it may be transferred on a longer distance using one or more modular groups, with a higher energy yield than the system based on a single line. The modular portion of device 1 according to the invention, which may be replicated both for extending the system and for improving the energy yield of the transport does not require synchronization, with the exception of the moment in which the material must be brought from output of the transport device to the input of the further transport device or expansion device, provided that the transport travels as fast as possible and so as to correctly handle the incoming material.

Synchronization needed between transport device and further transport device is controlled and regulated by electronic panel. Going back to the previous step for completing the operation thereof, with the second valve 16 for intercepting the material which of course is closed, the vent valve 12 upstream of such second valve 16 is now free to depressurize the tubular feeder 2 and start a new material loading cycle.

In device 1, as schematized in FIG. 1, once the material has reached and gone beyond the tubular feeder 2, small piles of material are created which at each controlled actuation of the valve system, as organized in the modular group, continue to move forward pushed by the alternating action of pulse jets of gaseous fluid, preferably consisting of air. The actuation of the valve system and the adjustment of the amount of gaseous fluid introduced in the tubular feeder may be managed and timed by centralized control means, such as for example a dedicated electronic control unit of the type known in the art, which also have the task of regulating and timing the cyclical cleaning of the "moon" closing zone of valves 8 and 16 for intercepting or transporting the material. This last function is particularly innovative in economic and ecological terms since no solvents or aggressive substances are used but compressed air, and in terms of operating life of the transport system 1 in general.

The area indicated with A in FIG. 1, or "variable material pick up configuration area", represents three of the many possible cases of pick-up of the material. Each of the three configurations is managed by two main valves, that is, the first valve 8 for intercepting or transporting the material and the first air interception valve 9 for pushing the material. Valves for cleaning valves 8 and 16 for intercepting or transporting the material and valves for the sealed closing of such valves 8 and 16 for intercepting or transporting the material are not shown in the diagram of FIG. 1 only for simplifying the illustration.

Moreover, the possibility of complying with all the law regulations related to hygiene and safety at workplace and production place is certain, therefore device 1 according to the invention may be conveniently used also in the foodstuff, pharmaceutical and chemical fields in general and also in those environments where the utmost care must be taken to prevent polluting situations, explosive, electrical short-circuit and fire phenomena, since device 1 does not use motors or actuators, neither electrical or internal combustion type. Only compressed air sources are provided, in any case arranged at suitable distances. The same concept may be applied to all the vent valves and it is therefore possible to provide a vent valve fitted onto hopper 4, obtaining the same advantages already described.

The steps of the process for the controlled feeding of incoherent solid materials according to the present invention may be summarized as follows. In a preliminary step, or "step zero", with device 1 off, hopper 4 is filled with a predetermined amount of material to be transported and the components of device 1 are in the following condition:
material fluidization valve 7: closed;
tubular feeder 2: empty;
first valve 8 for intercepting or transporting the material: closed;
vent valve 12: closed;
second valve 16 for intercepting or transporting the material: closed.

During the cycle start step ("step 1") the vent valve 12 is opened while the other components of device 1 are in the condition described above, that is:
material fluidization valve 7: closed;
tubular feeder 2: empty;
first valve 8 for intercepting or transporting the material: closed;
second valve 16 for intercepting or transporting the material: closed.

In the subsequent step of loading or filling the tubular feeder 2 ("step 2"), the following valves are open:
material fluidization valve 7: open;
first valve 8 for intercepting or transporting the material: open;
vent valve 12: open;
compressed air valve 5: open.

In this step, the material outflows from the fluidized zone of the bottom portion of hopper 4, thanks to the fluidization valve 7 assisted by the compressed air valve 5, with one or more pulses, if required in case of insufficient pressure differential ΔP(+).

As soon as the filling sensor 15 of the tubular feeder 2 confirms the presence of a suitable amount of material inside the same tubular feeder 2 ("step 3"), the material fluidization valve 7 and the compressed air valve 5 close. In this step, filter 13 is cleaned in counter current from inlet duct 21 with vent valve closed 12 by the filter cleaning valve 14.

At this point, the first valve 8 for intercepting or transporting the material closes again. The closing of such first valve 8 for intercepting or transporting the material is regulated and controlled carrying out the scheduled cleaning cycle by activating the cleaning valve, allowing the sealing closing valve to find the support surface of the closing sphere/semi-sphere clean and thereby to actuate the elastic seal.

Almost at the same time as the closing of the first valve 8 for intercepting or transporting the material and of the sealing closing valve, that is, in an infinitesimal short time, the first air interception valve 9 is already operating for introducing compressed air and thus allowing the forward pushing of the material.

As soon as one or more control devices signal a suitable pressure inside the tubular feeder 2 ("step 4"), the second valve 16 for intercepting or transporting the material is opened so as to make all the material go beyond and instantly, the first air interception valve 9 is closed as well. At this point, when the tubular feeder 2 is empty, the second valve 16 for intercepting or transporting the material is closed in "protected" mode, as it happened before with the first valve 8 for intercepting or transporting the material, that is, with the cleaning of the "moon" zone of the second valve 16 for intercepting or transporting the material through relative cleaning sealing valves. After an infinitesimal time interval, the opening of the second air interception valve 17 is actuated to finally transport all the material, in the form of subsequent piles, towards the outlet.

At the end of "step 4" it is possible to proceed with the preparation of a new material loading cycle, thereby returning to "step 1". If an enlargement or extension of device 1 is desired, it is simply necessary to fit one or more modular groups with sufficient cycles for handling the incoming material.

It should be noted that the type of material to be transported of course determines the operating parameters of the entire device 1. By way of an example, therefore, three types of material are indicated:

a) cement, concrete, heavy powders in general, mineral powders, etc.;
b) material in rough and porous form (such as coal, dried fruit like walnuts, peanuts, etc.) and material with a low specific gravity (such as tablets and the like, powders or granulates);
c) cases those are uncertain from the point of view of the nature of materials, depending on the operating limits resulting from the means for generating positive or negative compressed air.

The above process described in the forgoing is ideal and may be used in all the cases, wherein the features of the material to be transported correspond to group a). On the other hand, if the features of the material to be transported belong to group b), it will be necessary to proceed with a forced vacuum system, or with a mixed suction/vacuum system of the "push-pull" type.

The clear structural simplicity of system 1 according to the invention, provided with a limited number of standardized apparatuses, therefore allow the use of existing commercial valves as well, but suitably adapted. The operating life and the operating regularity of such valves, however, depend on how and in what point of the system they are inserted, and according to whether the opening and above all the closing movement may be hindered by the incoming material, which may consist of non-standard, hard and "cut to size" particles, thus generally of the incoherent solid type. Therefore, once the valves for intercepting or transporting the material have been closed, it is advisable to have already seen to preventing the damage resulting from the cloud of particles ready to sandblast any zone even minimally damaged and exposed to the back flow. It has thus been seen that the process and the tubular device for the controlled feeding of incoherent solid materials according to the present invention achieve the objects mentioned above.

Several changes and variations can be made to the process and the tubular device for the controlled feeding of incoherent solid materials of the present invention thus conceived, all falling within the same inventive concept; moreover, all details can be replaced with technically equivalent elements e.g. the feeding of material depending on numerous parameters as such as type of materials and pressure available etc. may require specific solutions known to the present art of engineering. E.g. the use of simplified valves such as non-return-valves (flaps) instead of standard line-interception valves depending on the application.

In the practice, the materials used as well as shapes and sizes, can be whatever, according to the technical requirements.

REFERENCE SIGNS

A variable material pick up configuration area
P pressure (positive/negative)
1 transport device
2 tubular feeder
3 pipeline
4 hopper
5 compressed air valve
6 material head sensor
7 fluidization valve
8 valve
9 air intercepting valve
10 fluidization inlet duct
11 vent duct
12 vent valve
13 filter
14 filter cleaning valve
15 filling sensor
16 valve
17 air intercepting valve
18 inlet duct
19 outlet of filtered air
20 inlet duct
21 inlet duct

The invention claimed is:

1. A transport device, comprising:
a pipeline;
a fluid source;
a pressurized tubular feeder for the controlled feeding of incoherent solid materials in differentiated pressure systems along the pipeline through the pressure of a gaseous fluid, the feeder including:
a loading hopper positioned at an inlet of the pipeline, for receiving the materials;
a fluidization inlet duct positioned within the hopper and having a fluidization valve, for carrying out fluidization of the materials;
a first material valve downstream of the hopper, for intercepting the materials;
a first fluid inlet duct for controlling admission of the fluid into the pipeline, positioned downstream of the first material valve, the first fluid inlet duct having a first fluid interception valve;
a second fluid inlet duct for controlling admission of the fluid into the pipeline and having a second fluid interception valve;
a second material valve for intercepting the materials and being arranged upstream of the second fluid inlet duct; and
a vent duct having a vent valve and a filter arranged upstream of the second material valve; and
a control means; and
a compressed fluid valve having a nozzle positioned within the hopper and configured to generate one or more pulses of fluid, to promote formation of a pulse wave within the pipeline.

2. The device according to claim 1, wherein the first and second material valves are configured to be freely openable up to 360°, and have a diameter equal to the nominal diameter of the tubular feeder.

3. The device according to claim 1, wherein the tubular feeder comprises, at each of the first and second material valves, inlet and outlet ducts for cleaning material residues.

4. The device according to claim 1, further including a material head sensor connected to the pipeline for measuring an amount of material inside the hopper.

5. The device according to claim 1, further including a filling control sensor for measuring a filling of the tubular feeder.

6. The device according to claim 1, wherein the pressurized tubular feeder forms the first section of the pipeline.

7. A system including two or more devices of claim 1.

8. The device according to claim 1, wherein the pressurized gaseous fluid consists of compressed air.

9. The device of claim 1, wherein the pipeline does not include a pressurized chamber.

* * * * *